United States Patent Office 3,079,035
Patented Feb. 26, 1963

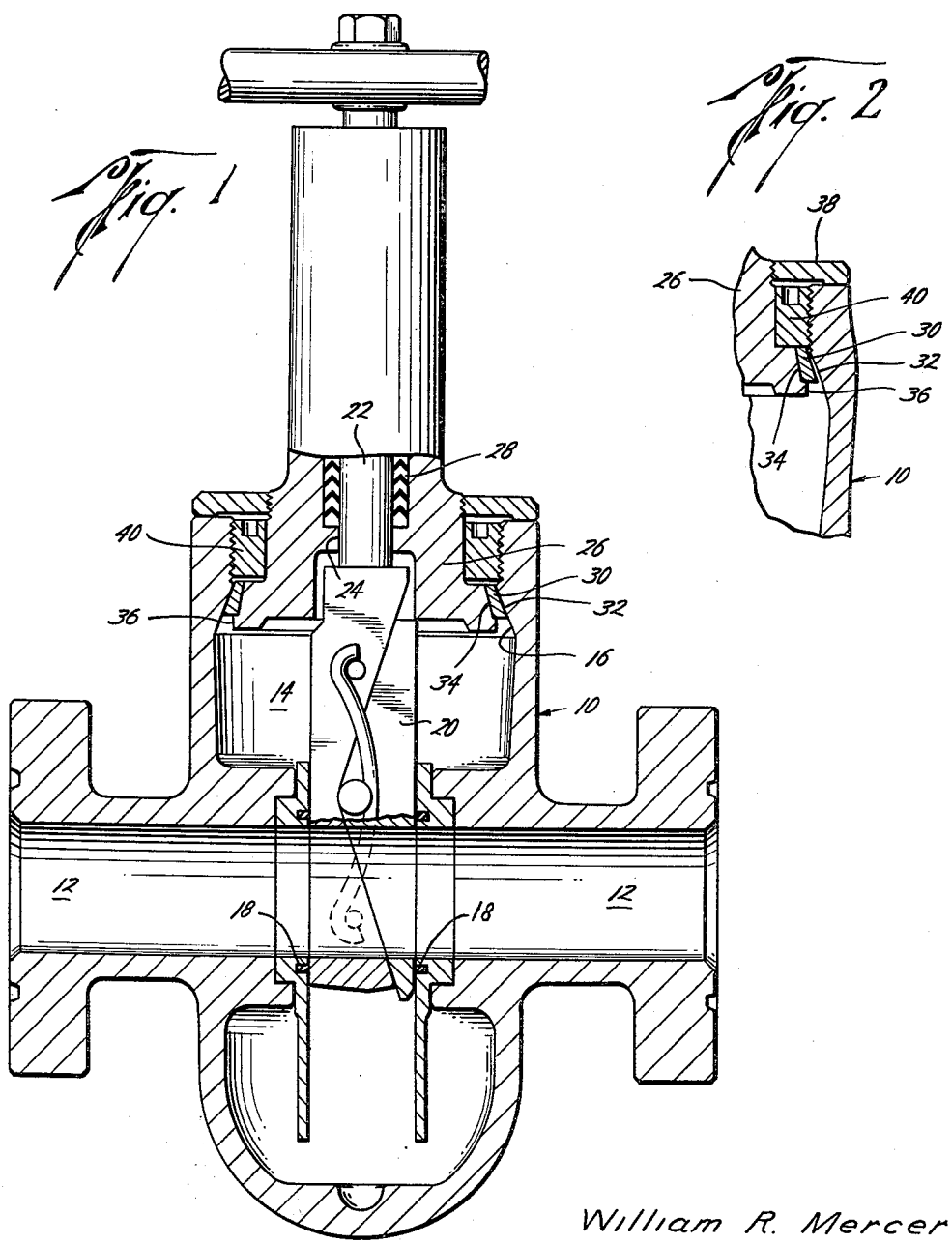

3,079,035
PRESSURE ACTUATED CLOSURE ASSEMBLY
William R. Mercer, Houston, Tex., assignor to ACF Industries Incorporated, New York, N.Y., a corporation of New Jersey
Filed July 3, 1961, Ser. No. 121,516
7 Claims. (Cl. 220—46)

This invention relates generally to a pressure actuated metallic seal ring closure assembly for pressure vessels in high pressure service.

One type of pressure vessels to which the invention is particularly applicable is valves. Most valves have an open-ended valve chamber in which is positioned the internal valve mechanism. The opening to the valve chamber is closed by a disengageable bonnet which permits entry into the chamber to make necessary repairs to the internal valve mechanism. Many other pressure vessels require a similar type opening where periodic entrance into the interior of the pressure vessel is desirable. The most common method of sealing the valve chamber opening has been to have a flanged bonnet bolted to the valve body with suitable means between effecting a seal. Such method is relatively expensive and time consuming to assemble and disassemble.

Another method of sealing such openings, which has met with considerable success in the valve art, has been to provide a pressure actuated seal. In one type of such seal the opening is provided with a frusto conical surface convergingly tapered axially outward. A circular bonnet or closure member having a similarly tapered peripheral surface and small enough to pass through the opening opposes the wall of the opening. A metallic ring is positioned between the closure member and wall of the opening to form a seal between the closure member and wall of the opening. The internal pressure in the body exerts a force upon the closure member which tends to move the closure member axially outward. The seal ring is sufficiently pliable to be forced into intimate contact with the closure member and wall of the opening effectively sealing the opening. As the pressure increases, the closure member and seal ring attempt to further move axially outward. The axially outward movement of the closure member and seal ring is resisted by the wall of the opening. As the internal pressure increases, the hoop stress of the wall surrounding the opening correspondingly increases due to the outward movement of the closure member and seal ring tending to expand the opening; therefore, the wall of the opening must be of a sufficient mass so as to resist expansion. While the pressure actuated sealing arrangement has the advantage of using the load multiplying effect of the angular surfaces to establish a seal with a small axial force, it has the disadvantage of requiring an extremely large mass to resist the outward movement of the closure member and seal ring and has a tendency to build up unduly high hoop stresses as high axial loads are applied. Examples of such closures are fully disclosed in M. P. Laurent's United States Patents, 2,582,995, 2,582,996, and 2,582,997.

In order to take advantage of the multiplying effect of angular surfaces to form a tight seal with small axial loads and at the same time eliminate unduly high hoop stresses, the closure assembly of the present invention utilized the above-described pressure actuated seal construction to attain the seal. However, continuous axial outward movement of the closure member and seal ring is restrained. Such construction transfers the load from bearing pressure on the wall resulting from movement of the closure and seal ring to expansion of the wall by internal pressure. The expansion of the wall reduces the bearing load between the wall and ring providing an automatic relief of pressure when the internal pressure exceeds the design limit of the pressure vessel.

The pressure vessel of the present invention has an opening with an outwardly converging tapering wall. Positioned in the opening is a closure member having a similarly tapering wall. A seal ring having mating surfaces is interposed between the closure member and wall of the pressure vessel. Axially outward of the closure member and seal ring there is provided a stop ring which will contact the closure member and seal ring to restrain axially outward movement of the closure member and seal ring after sufficient movement to establish a seal. The stop is so positioned that the closure member and seal ring can move out a controlled amount to effect a seal, however, axially outward movement past this point is restrained by the stop. Thereafter, axial outward movement of the closure member and seal ring is restrained and any further build-up in internal pressure will be in hoop stress which will tend to increase the size of the wall or decrease the bearing pressure between the wall of the opening and ring thereby effecting a leak between these two surfaces to relieve excessive pressure. Upon relief of the excessive pressures, the normal resiliency of the material forming the wall of the opening will bring it back into sealing contact with the seal ring. The load on the stop is not multiplied by any wedging action and therefore can be controlled with a smaller mass. The smaller mass also permits sufficient expansion to cause a leak before rupture.

It is an object of the present invention to provide a pressure actuated metallic seal ring closure assembly which is so constructed that there is a controlled automatic relief of excessive body pressures.

It is another object to provide a pressure actuated closure assembly in which the axially outward movement of the closure member and seal ring is controlled, and after movement for sealing load is transferred to expansion of the wall to decrease bearing pressure between the wall and ring to permit automatic relief of excess pressure thereby preventing rupture.

It is a further object to provide a pressure actuated closure assembly in which after a controlled amount of axially outward movement of the closure member, the closure member contacts a stop which restrains any further axially outward movement whereby further increase in pressure will cause the wall of the opening to expand within its elastic limit, decreasing bearing between wall and seal ring, permitting excessive pressure to escape and return to sealing condition.

It is a further object to provide a pressure actuated closure assembly in which the mass of the outer wall of the pressure vessel can be maintained at a minimum.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a vertical cross-sectional view of a valve equipped with the closure assembly of the present invention.

FIG. 2 is an enlarged sectional view of a portion of the closure assembly showing in an exaggerated manner expansion of the body and automatic relief on excessive pressure.

While the closure assembly is shown incorporated in a valve, it can be readily seen that the closure assembly of the present invention may be utilized as a closure assembly for an opening in any type of pressure vessel. The term "pressure vessel" employed herein is intended to include any structure of whatever description capable of retaining substance under pressure which is provided with an opening to furnish access to the interior thereof. The invention relates to a means for effecting the closure of the opening of such a vessel and not specifically to the nature or purpose of the vessel.

Referring now to the drawings, the pressure vessel chosen for purpose of description is a valve. The valve is formed of a valve housing 10 which is in effect a pressure vessel. The valve housing has a flow passage 12 therethrough which is interrupted by an open-ended valve chamber 14 having an opening 16. Valve seats 18—18 are arranged in the flow passage 12 at each side of the chamber 14 to provide seating surfaces for a valve member 20. A valve stem 22 is attached to the valve member 20 providing reciprocatory movement to move the valve member 20 into and out of sealing contact with the seats 18—18. The stem 22 extends outwardly of the valve chamber 14 through a sealed passage 24 in a bonnet or closure member 26 closing the opening 16. Leakage between the stem 22 and passage 24 is prevented by a stuffing box 28. As will be explained subsequently, the space between the bonnet 26 and the wall of the opening 16 is closed by a seal ring 30.

The bonnet assembly is insertable and removable relative to the valve housing to permit the renewing of the various working parts of the valve such as the stem, valve member, and seats while the valve remains in the line. Since lading flowing through the valve gets into the valve chamber 14, it is essential that a seal be maintained between the closure bonnet 26 and opening 16.

To provide the necessary seal, the peripheral surface of the wall 32 defining the opening 16 is generally frusto conical, taperingly converging axially outward of the housing. The closure member 26, which is circular in plan, has a similar outwardly converging tapered surface 34 commencing at the axial outer end of the closure member. The taper of the surface 34 is a lesser taper than the wall 32 of the opening. The surfaces 32 and 34 may converge in respect to each other as taught by the Laurent United States Patents 2,582,995, 2,582,996, and 2,582,997; however, by using the closure assembly of the present invention it is not necessary to employ the tapered wedge ring to retain the closure member in the opening, and if desired surfaces 32—34 may be of the same taper. The maximum diameter of the closure member 26 is less than the minimum diameter of the frusto conical opening 16 so that the closure member 26 may be inserted through the frusto conical opening 16. The peripheral wall surface 32 of the frusto conical opening 16 is spaced apart from the tapered surface 34 of the closure member 26 when the closure member 26 is in operative position and the metallic seal ring 30 is positioned in such space. The seal ring 30 has inner and outer surfaces corresponding to the surfaces 32—34. If desired, the closure member 26 may be provided with a shoulder 36 adjacent its inner axial end contacting the inside portion of the inner axial end face of the seal ring to insure stability of the seal ring 30 in reference to the closure member 26. To obtain the initial seal of said closure assembly, there is a clamp ring 38 which engages the bonnet 26 and top of the body and allows the bonnet 26 to be moved axially outward thus engaging the seal ring 30 with the surface 34 of the bonnet and surface 32 of the opening.

With such construction, as the internal body pressure increases the closure member 26 tends to move axially outward. Such movement forces the inner and outer surfaces of the seal ring 30 into intimate contact with the surfaces 32—34 of the housing and closure member increasing the bearing pressure between these surfaces thereby forming a tight metal-to-metal seal. It will be apparent that the greater the internal pressure the more tightly will the closure be seated and the better it will perform its function. It is so designed that upon decrease in pressure the closure will back off to the amount necessary to seal.

In order to prevent more axial outward movement than is necessary to establish a tight seal, previous assemblies reinforce the wall adjacent to the opening by utilizing a considerable mass of material. In order to cut down on the size of the wall and to still limit the amount of axial outward movement, the present invention has a stop 40 incorporated in the opening 16 axially outward of the seal ring 30. This stop 40 may be formed, as shown in the drawing, by threading the axial outer end of the opening 16 and threadedly engaging the stop 40 therewith. If the opening is too large for threading, other means may be utilized to properly secure the stop 40. The stop 40 is positioned axially outward of the seal ring 30 so that the seal ring can move sufficiently so that a tight metal-to-metal seal is formed between the closure member–seal ring–wall, see FIG. 1, at all pressures up to the design limit of the structure. The stop 40 will restrain axial outward movement of the seal ring 30 beyond a set amount. It has been found that spacing the stop approximately $\frac{1}{32}$" from the point of initial assembly permits sufficient axial outward movement to satisfactorily provide a seal. It is desirable that the stop be adjustable to take care of slight variations in manufacturing tolerances. Having a threaded stop as shown in the drawings, the closure can be assembled, the bonnet pulled outward to obtain a seal, the stop threaded inward until it contacts the bonnet, and then backed off the necessary amount.

During normal operation of the valve, the principal load is carried by the contact between surface 32 with the outer peripheral surface of the seal ring 30 and surface 34 with the inner peripheral surface of the seal ring 30 which causes a sufficiently high bearing pressure to maintain a positive seal. In effect, the closure of the present invention works similarly to that disclosed in the previously mentioned Laurent patents. Internal pressure in the chamber 14 will act upon the bottom of the closure member 26 and seal ring 30 respectively. Thus, any variation in the size of the parts due to expansion or contraction or any fluctuations in pressure will be compensated for by equivalent movement of the closure member 26 and seal ring 30, and it will be unnecessary to attend to the valve to periodically adjust it to maintain a seal because the seal is automatically maintained as a function of the internal pressure. However, if the internal pressure starts to exceed the limit for which the closure is designed, the closure member 26 and seal ring 30 will contact the stop 40 and further outward axial movement of the closure member 26 and seal ring 30 will be arrested. When the axial outward movement of the closure member 26 and seal ring 30 terminates as a result of the stop 40, the principal load is transferred from the contact between the seal ring 30 and surfaces 32—34 to load on the stop 40. The wall of the housing will continue to expand as the pressure increases reducing the bearing pressure between the seal ring 30 and surfaces 32—34.

As the bearing pressure between the seal ring 30 and the surfaces 32—34 decreases and there is an increase in internal pressure, the internal pressure will overcome the seal and leak past the seal ring 30 allowing the excessive pressure to escape, see FIG. 2. The fluid flowing past the seal ring will flow out past the clamp ring. This flow off of fluid will decrease the pressure and as long as the elastic limit of the body material has not been exceeded, the body material will come back to its original size reinstating the seal between the seal ring 30 and surfaces 32—34. Therefore, the present closure provides an automatic relief and prevents rupture of the valve. Once pressure is restored within designed limits, the seal will again automatically function.

As can be seen from the foregoing, the present invention discloses a pressure actuated closure assembly for sealing the openings of pressure vessels which is so constructed that during the design limit of the vessel the closure assembly will tightly seal and upon an increase in excess of design limit will automatically relieve the excess pressure preventing rupture of the vessel.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A gate valve comprising a housing having an open ended chamber, an axially outwardly converging tapered surface forming the opening of said chamber, the axial outer end of the surface being of a smaller diameter than is the axial inner end, a bonnet for said opening insertable through said opening, an axially outwardly tapered peripheral face on said bonnet of a lesser taper relative to the axis of the opening than the taper of the wall forming the opening, a seal between said bonnet surface and the surface of said opening comprising a metallic seal ring having peripheral surfaces mating with the tapered surface of the opening and tapered peripheral face of the bonnet, a shoulder adjacent the axial inner end of the bonnet contacting the inner axial end of the seal ring, a second shoulder on the bonnet adjacent the axial outer end of the tapered peripheral surface thereof, a clamp ring engaging said body and bonnet to move the bonnet and seal ring into said opening to form a seal for said opening, a threaded portion in the surface of said opening spaced axially outward of said bonnet and seal ring, a stop ring threadedly engaged with the threaded portion and extending into said opening to limit the axial outward movement of said bonnet and seal ring, said stop ring being positioned sufficiently distant from the said second shoulder of the bonnet and the axial outer end of the metallic seal ring when such bonnet and seal ring are at their point of initial assembly so as to permit sufficient axial outward movement thereof to form a seal but restraining further axially outward movement thereof whereby a further increase in internal pressure expands the housing decreasing the bearing load between the tapered surface of the housing, the peripheral surface of the closure member and the peripheral surfaces of the sealing ring to permit automatic relief of excessive pressures.

2. A gate valve comprising a housing having an open ended chamber, an axially outwardly converging tapered surface forming the opening of said chamber, the axial outer end of the surface being of a smaller diameter than is the axial inner end, a bonnet for said opening insertable through said opening, an axially outwardly tapered peripheral face on said bonnet of a lesser taper relative to the axis of the opening than the taper of the wall forming the opening, a seal between said bonnet surface and the surface of said opening comprising a metallic seal ring having peripheral surfaces mating with the tapered surface of the opening and tapered peripheral face of the bonnet, a shoulder on the bonnet adjacent the axial outer end of the tapered peripheral surface thereof, a clamp ring engaging said body and bonnet to move the bonnet and seal ring into said opening to form a seal for said opening, a threaded portion in the surface of said opening spaced axially outward of said bonnet and seal ring, a stop ring threadedly engaged with the threaded portion and extending into said opening to limit the axial outward movement of said bonnet and seal ring, said stop ring being positioned sufficiently distant from the said shoulder of the bonnet and the axial outer end of the metallic seal ring when such bonnet and seal ring are at their point of initial assembly so as to permit sufficient axial outward movement thereof to form a seal but restraining further axially outward movement thereof whereby a further increase in internal pressure expands the housing decreasing the bearing load between the tapered surface of the housing, the peripheral surface of the closure member and the peripheral surfaces of the sealing ring to permit automatic relief of excessive pressures.

3. A gate valve comprising a housing having an open ended chamber, an axially outwardly converging tapered surface forming the opening of said chamber, the axial outer end of the surface being of a smaller diameter than is the axial inner end, a bonnet for said opening insertable through said opening, an axially outwardly tapered peripheral face on said bonnet of a lesser taper relative to the axis of the opening than the taper of the wall forming the opening, a seal between said bonnet surface and the surface of said opening comprising a metallic seal ring having peripheral surfaces mating with the tapered surface of the opening and tapered peripheral face of the bonnet, a shoulder on the bonnet adjacent the axial outer end of the tapered peripheral surface thereof, a clamp ring engaging said body and bonnet to move the bonnet and seal ring into said opening to form a seal for said opening, a stop ring positioned in the opening axially outward of said bonnet and seal ring threadedly engaged with the threaded portion and extending into said opening to limit the axial outward movement of said bonnet and seal ring, said stop ring being positioned sufficiently distant from the said shoulder of the bonnet and the axial outer end of the metallic seal ring when such bonnet and seal ring are at their point of initial assembly so as to permit sufficient axial outward movement thereof to form a seal but restraining further axially outward movement thereof whereby a further increase in internal pressure expands the housing decreasing the bearing load between the tapered surface of the housing, the peripheral surface of the closure member and the peripheral surfaces of the sealing ring to permit automatic relief of excessive pressures.

4. A gate valve comprising a housing having an open ended chamber, an axially outwardly converging tapered surface forming the opening of said chamber, the axial outer end of the surface being of a smaller diameter than is the axial inner end, a bonnet for said opening insertable through said opening, an axially outwardly tapered peripheral face on said bonnet, a seal between said bonnet surface and the surface of said opening comprising a metallic seal ring having peripheral surfaces mating with the tapered surface of the opening and tapered peripheral face of the bonnet, a shoulder adjacent the axial inner end of the bonnet contacting the inner axial end of the seal ring, a second shoulder on the bonnet adjacent the axial outer end of the tapered peripheral surface thereof, a clamp ring engaging said body and bonnet to pull the bonnet and seal ring into said opening to form a seal for said opening, a stop ring positioned in said opening axially outward of said bonnet and seal ring and extending into said opening to limit the axial outward movement of said bonnet and seal ring, said stop ring being positioned sufficiently distant from the said second shoulder of the bonnet and the axial outer end of the metallic seal ring when such bonnet and seal ring are at their point of initial assembly so as to permit sufficient axial outward movement thereof to form a seal but restraining further axial outward movement thereof whereby a further increase in internal pressure expands the housing decreasing the bearing load between the tapered surface of the housing, the peripheral surface of the closure member and the peripheral surfaces of the sealing ring to permit automatic relief of excessive pressures.

5. A gate valve comprising a housing having an open ended chamber, an axially outwardly converging tapered surface forming the opening of said chamber, the axial outer end of the surface being of a smaller diameter than is the axial inner end, a bonnet for said opening insertable through said opening, an axially outwardly tapered peripheral face on said bonnet, a seal between said bonnet surface and the surface of said opening comprising a metallic seal ring having peripheral surfaces mating with the tapered surface of the opening and tapered peripheral face of the bonnet, a shoulder on the bonnet adjacent the axial outer end of the tapered peripheral surface thereof, a clamp ring engaging said body and bonnet to pull the bonnet and seal ring into said opening to form a seal for said opening, a stop ring positioned in said opening axially outward of said bonnet and seal ring and extending into said opening to limit the axial outward movement of said bonnet and seal ring, said stop ring being positioned sufficiently distant from the shoulder of the bonnet and the axial outer end of the metallic seal ring when such bonnet and seal ring are at their point of initial assembly so as to permit sufficient axial outward movement thereof to form a seal but restraining further axial outward movement thereof whereby a further increase in internal pressure expands the housing decreasing the bearing load between the tapered surface of the housing, the peripheral surface of the closure member and the peripheral surfaces of the sealing ring to permit automatic relief of excessive pressures.

6. A closure assembly for an opening in a pressure vessel comprising: a pressure vessel having an opening in a wall thereof, the peripheral surface of the wall defining the opening taperingly converging outwardly of the vessel, a closure member for said opening insertable through said opening, an axially outwardly tapered peripheral face on said closure member, the peripheral wall surface of said frusto conical opening being spaced apart from the tapered peripheral face of said closure member when the closure member is in operative position providing a space therebetween, a metallic annular seal ring interposed between the tapered peripheral face of said closure member and the wall of said opening, said ring forming a seal between said closure member and said opening, a shoulder adjacent the axial inner end of the closure member contacting the axial inner end of the seal ring, a second shoulder on the closure member adjacent the axial outer end of the tapered peripheral surface thereof, means engaging the pressure vessel and closure member to pull the closure member and seal ring into operative position, a stop in said opening axially outward of said seal ring extending into the opening to restrain axially outward movement of said closure member and seal ring, said stop ring being positioned sufficiently distant from the point of initial assembly so as to permit sufficient axial outward movement thereof to form a seal but restraining further axially outward movement thereof whereby a further increase in internal pressure expands the housing decreasing the bearing load between the tapered surface of the housing, the peripheral surface of the closure member and the peripheral surfaces of the sealing ring to permit automatic relief of excessive pressure.

7. A closure assembly for an opening in a pressure vessel comprising; a pressure vessel having an opening in a wall thereof, the peripheral surface of the wall defining the opening taperingly converging outwardly of the vessel, a closure member for said opening insertable through said opening, an axially outwardly tapered peripheral face on said closure member, the peripheral wall surface of said frusto conical opening being spaced apart from the tapered peripheral face of said closure member when the closure member is in operative position providing a space therebetween, a metallic annular seal ring interposed between the tapered peripheral face of said closure member and the wall of said opening, said ring forming a seal between said closure member and said opening, a shoulder on the closure member adjacent the axis outer end of the tapered peripheral surface thereof, means engaging the pressure vessel and closure member to pull the closure member and seal ring into operative position, a stop in said opening axially outward of said seal ring extending into the opening to restrain axially outward movement of said closure member and seal ring, said stop ring being positioned sufficiently distant from the point of initial assembly so as to permit sufficient axial outward movement thereof to form a seal but restraining further axially outward movement thereof whereby a further increase in internal pressure expands the housing decreasing the bearing load between the tapered surface of the housing, the peripheral surface of the closure member and the peripheral surfaces of the sealing ring to permit automatic relief of excessive pressure.

References Cited in the file of this patent
UNITED STATES PATENTS

| | | |
|---|---|---|
| 2,582,995 | Laurent | Jan. 22, 1952 |
| 2,810,494 | Smith | Oct. 22, 1957 |